United States Patent [19]

Broughton et al.

[11] 4,223,124

[45] Sep. 16, 1980

[54] METHOD FOR PRODUCING POLYESTERS CONTAINING LOW AMOUNTS OF ETHER BY-PRODUCTS

[75] Inventors: Roy M. Broughton, Auburn, Ala.; Joseph R. Thomas, New Martinsville, W. Va.; Terence E. Winters, Gates Mills, Ohio

[73] Assignee: The Goodyear Tire & Rubber Company, Akron, Ohio

[21] Appl. No.: 51,097

[22] Filed: Jun. 22, 1979

[51] Int. Cl.² ............................................. C08G 63/16
[52] U.S. Cl. ................................... 528/272; 528/274; 528/279; 528/280; 528/281; 528/283; 560/92
[58] Field of Search .............. 528/272, 274, 279, 280, 528/281, 283; 560/92

[56] References Cited

U.S. PATENT DOCUMENTS

| | | | |
|---|---|---|---|
| 3,427,287 | 2/1969 | Pengilly | 528/305 |
| 4,020,049 | 4/1977 | Rinehart | 528/274 |
| 4,165,420 | 8/1979 | Rinehart | 528/272 |

*Primary Examiner*—Lucille M. Phynes
*Attorney, Agent, or Firm*—Daniel J. Hudak; J. P. Ward

[57] ABSTRACT

A method for decreasing the amount of ether as a by-product in polyesters (for example terephthalic-based) by initially utilizing a deficient amount of a glycol (for example, ethylene glycol) in the early reaction stages and utilizing an excess of the glycol in the final or end stages. The polyesters produced are of better quality, have a high melting point, possess increased thermal stability, and yield improved fiber properties.

23 Claims, No Drawings

METHOD FOR PRODUCING POLYESTERS CONTAINING LOW AMOUNTS OF ETHER BY-PRODUCTS

BACKGROUND OF THE INVENTION

The present invention relates to reducing the amount of ether content in polyesters as a by-product.

Heretofore, polyesters have been prepared by the reaction of a carboxylic acid or esters thereof with polyols, e.g., glycols. As well known to those skilled in the art, an ether by-product is produced during the process, and therefore is inherently contained in the polyester. Ether links are light sensitive and thus degrade in the presence of light. Moreover, in the presence of heat, thermal degradation readily occurs. The net result is a polyester having reduced stability such that the molecular weight is affected by light or heat and reduces various physical properties such as tensile strength, flex strength, and the like.

Heretofore, U.S. Pat. No. 3,442,868 taught a process for producing fiber-forming polyesters, for example, polyethylene terephthalate without direct contact of the acid and glycol components comprising, as a first step, reacting terephthalic acid with an oligomer (A) comprising the reaction product of such terephthalic acid and a glycol, said oligomer (A) having a degree of polymerization of one or more but less than three and having terminal hydroxyl groups to form an oligomer (B) having a higher degree of polymerization, that is from 3 to 10 and hydroxyl groups substantially at the termini; as a second step, reacting at least a portion of an oligomer (B) with a glycol to depolymerize (B) to form oligomer (A') having a degree of polymerization of one or more but less than three; and, as a third step, forming the fiber-forming polyester by polycondensing a material comprising any remaining portion of an oligomer (B), a portion of oligomer (A') or mixtures thereof while recycling the remaining portion of oligomer (A') for use as oligomer (A) in the first step. Thus, such a process basically relates to a glycolizing step which actually breaks down the oligomer to produce bis(2-hydroxyethyl) terephthalate. Thus, ethylene glycol is added to actually break down the chain. Moreover, large amounts of ethylene glycol are used initially.

U.S. Pat. No. 3,849,379 is similar in that an amount of precondensate is glycolized to bis(2-hydroxyethyl) terephthalate by the addition of ethylene glycol. Hence, it is not pertinent.

Other patents relating to the production of polyesters, largely with regard to producing low glycol ether content include the following: U.S. Pat. No. 4,079,046; 4,077,945; 3,919,288; 3,819,585; 3,697,579; 3,651,125; 3,644,483; 3,534,082; 3,506,622; 3,487,049; and 3,468,849. However, none of these patents relate to applicant's incremental addition of initially a majority of carboxylic acids followed by a later stage addition of a majority of a glycol.

SUMMARY OF THE INVENTION

It is therefore an object of the present invention to reduce the glycol ether content of a polyester.

It is another object of the present invention to provide a polyester having a reduced glycol ether content, as above, having improved light and thermal stability, as well as molecular weight retention.

It is a further object of the present invention to provide a polyester having a reduced glycol ether content, as above, wherein a glycol is incrementally added during the esterification stage of the reaction.

It is still another object of the present invention to provide a polyester having a reduced glycol ether content, as above, wherein the number of incremental additions ranges from two to infinity, that is a continuous slow addition over an extended period of time.

It is a still further object of the present invention to provide a polyester having a reduced glycol ether content, as above, wherein a deficiency of said glycol is added during the initial portion of said esterification reaction.

It is yet another object of the present invention to provide a polyester having a reduced glycol ether content, as above, wherein an excess of said glycol is added during the later stages of said esterification reaction.

It is yet a further object of the present invention to provide a polyester having a reduced glycol ether content, as above, wherein said glycol and said carboxylic acid are added to a polyester oligomer solution and said resulting mixture is heated and pressurized to carry out said esterification reaction.

It is yet another object of the present invention to provide a polyester having a reduced glycol ether content, as above, wherein said esterification reaction is carried out in an inert atmosphere.

It is yet another object of the present invention to provide a polyester having a reduced glycol ether content, as above, wherein said esterfied product is subjected to a condensation reaction in the presence of a vacuum and a catalyst to produce said polyester having a low ether content and improved light and thermal stability.

These and other objects of the present invention will become apparent by reference to the preferred embodiments of the invention.

In general, a process for reducing the glycol ether content formed during the esterification reaction in making a polyester, comprises the steps of:

adding to a heel solution in a vessel a dicarboxylic acid selected from the class consisting of alkyl dicarboxylic acids having from 2 to 16 carbon atoms, aryl dicarboxylic acids containing from 8 to about 16 carbon atoms, and alkyl substituted aryl dicarboxylic acids containing from 8 to about 16 carbon atoms;

conducting an esterification reaction by adding a glycol containing from 2 to 12 carbon atoms and heating said vessel to a temperature of from about 20° C. below the boiling point to about 100° C. above the boiling point of said glycol;

adding during the initial portion of said esterification reaction a deficient equivalent weight amount of said glycol so that an esterfied acid solution having a low ether content is produced; and retaining a portion of said esterfied acid solution as a heel solution.

Additionally, a polyester having low ether content produced according to a reaction comprises the steps of:

adding to a heel solution in a vessel a dicarboxylic acid selected from the class consisting of alkyl dicarboxylic acids having from 2 to 16 carbon atoms, aryl dicarboxylic acids containing from 8 to 16 carbon atoms, and alkyl substituted aryl dicarboxylic acids containing from 8 to about 16 carbon atoms;

conducting an esterification reaction by adding a glycol containing from 2 to 12 carbon atoms and heating said vessel to a temperature of from about 20° C. below the boiling point to about 100° C. above the boiling point of said glycol;

adding during the initial esterification reaction a deficient equivalent weight amount of said glycol so that an esterfied acid having a low ether content is produced;

retaining a portion of said esterfied acid solution as a heel solution;

removing the remaining portion of said esterfied acid solution; and condensing said remaining esterfied acid solution by drawing a vacuum and adding a catalyst to produce a polyester having a low ether content.

PREFERRED EMBODIMENTS OF THE INVENTION

In the typical or conventional preparation of polyesters, dicarboxylic acids are reacted with glycols to produce the polymer. Inherent in the manufacture of polyesters is the production of glycol ethers which often are chemically bound to the polyester chain. Since small amounts of glycol ethers are harmful to light and thermal stability of the polyester chain and can drastically affect physical properties, it is highly desirable to reduce the amount of the ether in the polymer chain. According to the concepts of the present invention, incremental amounts of the glycol are added during the esterification reaction, that is before the condensation reaction. It has been found that a low glycol ether content can be produced when a deficiency of glycol is added during the initial reaction stages followed by an excess of glycol during the latter or end stages.

In the manufacture of a polyester, a carboxylic acid is reacted with a glycol. Generally, such polyesters include polymers formed from dicarboxylic acids containing a total of from 2 to 16 carbon atoms reacted with a glycol containing from 2 to 12 carbon atoms. The dicarboxylic acids may be an alkyl-type containing a total of from 2 to 16 carbon atoms. Preferably, the acids are aryl or an alkyl substituted aryl-type containing from 8 to 16 carbon atoms. Specific examples of linear or alkyl discarboxylic acids include oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic acid (terephthalic acid) and naphthalic acid. Specific examples of alkyl substituted aryl acids include the various isomers of dimethylphthalic acid such as dimethylterephthalic acid, the various isomers of diethylphthalic acid such as diethylisophthalic acid, diethylorthophthalic acid, diethylterephthalic acid, the various isomers of dimethylnaphthalic acid such as 2,6-dimethylnaphthalic acid and 2,5-dimethylnaphthalic acid, and the various isomers of diethylnaphthalic acid. Generally, dimethylterephthalic acid is preferred with terephthalic acid being highly preferred.

The glycols may be straight-chain or branched. Specific examples include ethylene glycol, propylene glycol, trimethylene glycol, 1,2-butane diol, 1,3-butane diol, 1,4-butane diol, 2,3-butane diol, neopentyl glycol, and the like. Of the various glycols, those having from 2 to 8 carbon atoms are preferred, with ethylene glycol and 1,4-butane diol being highly preferred.

Generally, the equivalent weight ratio of the overall or total amount of glycol added to the carboxylic acid during the entire esterification reaction ranges from about 0.8 to about 1.5, desirably 0.9 to 1.4, preferably from about 1.15 to about 1.25, and optimally about 1.20. According to the present invention, these components are allowed to react for a period of time such as from about 30 to about 600 minutes, desirably from about 90 to 150 minutes depending upon the reaction conditions, thereby producing oligomers. A fraction thereof, typically from ¼ to about ¾ is withdrawn and subjected to a condensation reaction to make a suitable or usable polyester. The remaining portion, commonly referred to in the art as a "heel," is utilized as a solvent for fresh carboxylic acid. That is, to the "heel" is added a desired amount of fresh, virgin, or unreacted carboxylic acid and glycol in a manner according to the present invention. A more in depth description of the heel preparation process is set forth in U.S. Pat. No. 4,020,049 to Rhinehart and in U.S. Pat. No. 3,427,287 to Pengilly, which are hereby fully incorporated by reference. The ratio of heel to the batch (that is the overall amount of newly added unreacted carboxylic acid and total glycol) desirably ranges from about 0.8 to about 1.6, preferably from 1.0 to about 1.4 and optimally about 1.2 on a weight basis.

The present invention relates to the incremental addition of the glycol to the heel solution and carboxylic acid during the source of the esterification reaction which is carried out in the presence of heat, generally under pressure, and optionally with the use of conventional catalysts. The carboxylic acid can either be totally added to the heel or oligomer solution either before or at the commencement of the esterification reaction, or in incremental amounts throughout the reaction. However, the key factor is that initially the reaction is run with a deficiency of the glycol and an excess of the carboxylic acid. In other words, at the onset or during the initial esterification reaction, the equivalent ratio of the initial glycol content to the acid is less than the optimum 1.2 (i.e., 0 to 1.2) overall or final ratio, desirably is from about 0.5 to about 1.0, preferably is from about 0.6 to about 0.9, and highly preferred is from about 0.7 to about 0.8 weight equivalents. Generally, it has been found that the lower the glycol to carboxylic acid ratio, and the greater the number of incremental additions of the ethylene glycol, either with or without any acid, the lower the amount of the glycol ether produced as by-product.

The number of incremental additions of ethylene glycol may range from 2 to infinity. The total amount of dicarboxylic acid can be added initially or generally in any number of steps. However, the glycol in the first step is a deficient amount of the overall glycol/dicarboxylic acid equivalent final ratio. Naturally, since a deficiency of glycol is added in the first stage, an excess with regard to the overall or final glycol/acid ratio will be contained in the final stages to obtain the the overall desired glycol/acid equivalent weight ratio. As noted, any number of separate or incremental additions may be utilized. Moreover, an infinite number of additions may be utilized as when the glycol is continuously added throughout the entire reaction time period. Even when continuous glycol addition is utilized, the amount added initially either to the total amount of acid existing with the heel solution is initially a deficiency with regard to the overall final glycol/acid ratio. As should be apparent to one skilled in the art, so long as these requirements are met, the exact amount of glycol addition can follow along a great number of different routes.

The esterification reaction proceeds preferably in an inert atmosphere such as nitrogen helium, argon, carbon dioxide. Generally, the reaction is carried out at pressures within the reaction vessel or container from atmospheric to about 100 psi. Desirably, the pressure ranges from about 25 psi to about 80 psi and preferably from about 30 psi to about 75 psi.

Moreover, the reaction vessel is heated to a temperature generally near and preferably above the boiling point of the particular glycol utilized. Thus, in one of the preferred embodiments of the invention wherein polyethylene terephthalate is produced, the glycol is ethylene glycol which has a boiling point of about 200° C. at atmospheric pressure. A desirable temperature of the vessel and the contents therein with this particular system ranges from about 180° C. to a maximum of about 290°, and preferably from about 225° to about 280° C. Generally, the temperature of the vessel for any particular glycol usually ranges from about 20° below the boiling point to about 100° C. about the boiling point, desirably from the boiling point to about 90° above it, and preferably from about 20° above to about 80° C. above the boiling point.

Once the esterification step has been carried out, a condensation step is initiated and carried out according to any conventional manner. This generally entails applying a vacuum of 5 millimeters of mercury or less, preferably less than 1 millimeter of mercury, and optimally less than 0.5 millimeters of mercury. The temperature range of the condensation reaction is generally from about 180° to about 290° C. and preferably from about 225° to about 280° C. The condensation catalysts can be antimony, iron, titanium, zinc, cobalt, lead, manganese, niobium, and the like, as well known to those skilled in the art. The amount of catalysts is also conventional and varies depending upon whether an active catalyst is utilized such as titanium, wherein only 5 parts of catalysts per million parts of esterfied product is required, or a catalyst with a slower reaction rate such as antimony wherein approximately 200 parts per million of esterfied products may be utilized.

The present invention will be better understood by reference to the following examples.

In all examples, the reaction is carried out using low molecular weight oligomer (heel) as the reaction solvent. A batch is charged, mixed with the heel, allowed to react, and then discharged. The heel to batch ratio was 1.2/1. Obviously, several batches were run consecutively to allow the heel to stabilize before polymer properties were determined. Polymer intrinsic viscosity (IV) was determined in 60/40 phenol/tetrachloroethylene.

TPA—Terephthalic Acid
EG—Ethylene Glycol
NaOAc—Sodium Acetate

EXAMPLE I

CONTROL

A reactor containing stabilized heel was charged with 17.3 lbs. of TPA, 7.74 lb. EG and 0.486 g of NaOAc. The mixture was heated at 240°–250° C. and 35 psig ($N_2$) for about 210 minutes while water was removed via a column. The batch was discharged to a second vessel, $Sb_2O_3$ (2.24 g) was added, pressure was gradually decreased to <0.5 mm Hg (and held for one hour), and the temperature was gradually increased to ~280° C.

Polymer properties were: 0.6 IV, 257.4° C. melting point, 1.32 weight percent DEG (estimated).

EXAMPLE II

BATCHES

The procedure of Example I was repeated with the following exceptions:
1. The EG was added in seven equal weight portions at 20 minute intervals.
2. The time required to remove the water was increased to ~250 minutes.
3. Polymer properties were: 0.6 IV, 258.0 melting point, 1.18 weight percent DEG (estimated).

EXAMPLE III

CONTROL

A reactor containing stabilized heel was charged with 17.3 lb. TPA, 7.74 lb. EG. 0.486 NaOAc and 3.2 ml triethylene glycol diphosphite. Temperature was increased to about 265° C. and pressure maintained at 35 psig ($N_2$) while water was removed via a column. Reaction required about 150 minutes after which time the batch was discharged to a second vessel. Antimony trioxide was added (2.28 g), pressure was reduced to <1 mm Hg pressure, over about 70 minutes, held for about one hour, and temperature was gradually increased to about 290° C.

Polymer properties were: 0.6 IV, 253.8° C. melting point, 1.85 weight percent DEG (estimated).

EXAMPLE IV

The reaction was run as in Example III with the following exceptions:
1. Reactions were charged in four increments:

| | | |
|---|---|---|
| 30 | percent by weight of TPA charged initially | |
| 33 | percent by weight of TPA and 30% of EG | At 40 minute intervals |
| 37 | percent by weight of TPA and 33 percent of EG | |
| 37 | percent by weight of EG | |

2. Temperature was 240°–250° C. and time required for reaction was ~225 minutes.

Polymer properties were: 0.6 IV, 254.7° C. melting point, 1.67 weight percent DEG (estimated).

EXAMPLE V

The reaction was run as in Example III with the following exceptions:
1. Only 30 percent by weight of the TPA was initially charged. After one hour, a slurry of the remaining TPA and EG was pumped to the reactor over a 70 minute period.
2. Temperature ranged between 250° and 266° C., and time to complete the esterification was ~212 minutes.

Polymer properties were: 0.6 IV, 254.7° C. melting point, 1.72 weight percent DEG (estimated).

EXAMPLE VI

The reaction was run as in Example V with the exception that slurry was added over 140 minutes, beginning 30 minutes after the initial TPA charge. Reaction time was 202 minutes.

Polymer properties were: 0.6 IV, 256.4° C. melting point, and 1.47 weight percent DEG (estimated).

EXAMPLE VII

CONTROL

A reactor containing stabilized heel was charged with 8.64 lb. TPA, 3.88 lb. EG, and .421 g NaOAc. The mixture was heated at 250°–265° C. and 35 psig ($N_2$) for 90 minutes while removing water via a column. The batch was transferred to a second vessel and after the addition of 1.42 g $Sb_2O_3$ and 2.0 ml. of TEDP (triethylenediphosphite), pressure was reduced to <1 mm Hg over a one hour period and temperature was increased to about 275° C. The batch was discharged and a small sample was polymerized at 275° C. and <1 mm Hg for ~ two hours until IV >0.4. DEG content of the polymer was 1.15 weight percent (measured by a gas chromatographic procedure).

EXAMPLE VIII

The procedure of Example VII was repeated with the following exception: TPA was added to the reactor and after about a 20-minute hold time (batch temperature at 265° C.), the EG was pumped into the reactor over a period of about 85 minutes. Reaction time was about 110 minutes and polymer DEG content was 0.99 weight percent.

The results of the examples are set forth in Table I.

TABLE I

TEREPHTHALATE - POLYESTERS PRODUCED UNDER INITIAL GLYCOL-DEFICIENT CONDITIONS

| EXAMPLE | PROCEDURE | EG/TPA MOLAR RATIO | METTLER MP °C. | DEG LEVEL (Est.) | TIME (Min.) |
|---|---|---|---|---|---|
| I | Control | 1.2/1 | 257.4 | 1.32 | 208 |
| II | 1. All TPA | 0.60/1 | | | |
| | 2. EG in 7 equal portions at 20 min. intervals | 0.60→1.2/1 | 258.0 | 1.18 | 252 |
| III | Control | | 253.8 | 1.85 | 145 |
| IV at 40 min. intervals | 1. 30% TPA | 0.92/1 | | | |
| | 2. 33% TPA + 30% EG | 0.96/1 | | | |
| | 3. 37% TPA + 33% EG | 0.98/1 | | | |
| | 4. 37% EG | 1.2/1 | 255.0 | 1.67 | 230 |
| V | 1 30% TPA | 0.92/1 | | | |
| | 2 →S/1.7 remaining TPA and EG added continuously as slurry | | | | |
| | A. Over 70 min. starting 60 min. after TPA addition | 0.92→1.2/1 | 254.7 | 1.72 | 212 |
| VI | B. Over 140 min., starting 60 min. after TPA addition | | 256.4 | 1.47 | 202 |
| VII | Control | 1.2/1 | | 1.15* | 90 |
| VIII | All TPA EG added continuously over 85 min., beginning when batch temperature became 265° C. | .60→1.2/1 | | .99* | 110 |

*Not estimated, but actually determined
Melting points and cycle times are averages of several batches
The diethylene glycol levels were estimated in view of previous extremely good correlations having been established between DEG levels and melting points as established by a Mettler apparatus As apparent from Table I, it can be seen that a reduced deficient addition of ethylene glycol resulted in reduced diethylene glycol content. Generally, the lower the initial addition of ethylene glycol or the addition at a later point in time as a continuous slurry resulted in a vast reduction of DEG content.

While in accordance with the patent statutes, a detailed description of the preferred embodiment and best mode has been set forth, the invention is measured by the attached claims.

What is claimed is:

1. A process for reducing the glycol ether content formed during the esterification reaction in making a polyester, comprising the steps of:
    adding to a heel solution in a vessel a dicarboxylic acid selected from the class consisting of alkyl dicarboxylic acids having from 2 to 16 carbon atoms, aryl dicarboxylic acids containing from 8 to about 16 carbon atoms, and alkyl substituted aryl dicarboxylic acids containing from 8 to about 16 carbon atoms;
    conducting an esterification reaction by adding a glycol containing from 2 to 12 carbon atoms and heating said vessel to a temperature of from about 20° C. below the boiling point to about 100° C. above the boiling point of said glycol;
    adding during the initial portion of said esterification reaction a deficient equivalent weight amount of said glycol so that an esterified acid solution having a low ether content is produced; and
    retaining a portion of said esterfied acid solution as a heel solution.

2. A process according to claim 1 including pressurizing said vessel from atmospheric pressure to about 100 psi within an inert gas.

3. A process according to claim 2, wherein the total amount of said glycol added during said entire esterification reaction ranges from about 0.8 to about 1.5 weight equivalents based upon the amount of said dicarboxylic acid.

4. A process according to claim 3, wherein said deficient amount of said glycol is an equivalent ratio of said glycol to said dicarboxylic acid ranging from 0 to 1.2 weight equivalents.

5. A process according to claim 4, including adding said glycol in incremental amounts to said dicarboxylic acid, and wherein the overall ratio of said heel to said glycol and dicarboxylic acid added during said entire esterification reaction ranges from about 0.8 to about 1.6 weight equivalents.

6. A process according to claim 5, wherein the number of incremental additions ranges from 2 to infinity.

7. A process according to claim 6, including adding an equivalent weight excess of said glycol in the later stages of said esterification reaction.

8. A process according to claim 7, wherein said deficient equivalent weight amount of said glycol added initially is from 0.5 to 1.0.

9. A process according to claim 7 or 8, wherein said inert gas is selected from the class consisting of nitrogen, helium, argon, and carbon dioxide, wherein said temperature range of said esterification reaction ranges from about the boiling point to about 90° C. above the boiling point of said glycol, and wherein the pressure of said vessel ranges from about 25 to about 80 psi.

10. A process according to claim 5 or 8, wherein said dicarboxylic acid is terephthalic acid, and wherein said glycol is selected from the class consisting of ethylene glycol, and 1,4-butane diol.

11. A process according to claim 10, wherein said glycol-dicarboxylic acid equivalent weight ratio for said entire esterification reaction ranges from 0.9 to 1.4.

12. A process according to claim 11, wherein said glycol-acid equivalent weight ratio for said entire esterification reaction ranges from 1.15 to about 1.25.

13. A polyester having low glycol ether content produced according to a reaction comprising the steps of:
adding to a heel solution in a vessel a dicarboxylic acid selected from the class consisting of alkyl dicarboxylic acids having from 2 to 16 carbon atoms, aryl dicarboxylic acids containing from 8 to 16 carbon atoms, and alkyl substituted aryl dicarboxylic acids containing from 8 to about 16 carbon atoms;
conducting an esterification reaction by adding a glycol containing from 2 to 12 carbon atoms and heating said vessel to a temperature of from about 20° C. below the boiling point to about 100° C. above the boiling point of said glycol;
adding during the initial esterification reaction a deficient equivalent weight amount of said glycol so that an esterfied acid having a low ether content is produced;
retaining a portion of said esterfied acid solution as a heel solution;
removing the remaining portion of said esterfied acid solution; and
condensing said remaining esterfied acid solution by drawing a vacuum and adding a catalyst to produce a polyester having a low ether content.

14. A product according to claim 13, including pressurizing said vessel during said esterification reaction from atmospheric pressure to about 100 psi with an inert gas, and
heating said condensation stage to a temperature of from about 180° C. to about 290° C.

15. A product according to claim 14, wherein the total amount of said glycol added during said entire esterification reaction ranges from about 0.8 to about 1.5 weight equivalents based upon the amount of said dicarboxylic acid, wherein said deficient amount of said glycol is an equivalent ratio of said glycol to said dicarboxylic acid ranging from 0 to 1.2 weight equivalents, and
wherein said vacuum applied during said condensation step is less than 5 millimeters of mercury.

16. A product according to claim 15, including adding said glycol in incremental amounts to said dicarboxylic acid.

17. A product according to claim 16, wherein the number of incremental additions of said glycol ranges from 2 to infinity.

18. A product according to claim 17, including adding an equivalent weight excess of said glycol to the latter stages of said esterification reaction.

19. A product according to claim 18, wherein said deficient equivalent weight amount of said glycol added initially is from 0.5 to 1.0.

20. A product according to claim 18 or 19, wherein said inert gas is selected from the class consisting of nitrogen, helium, argon, and carbon dioxide, and wherein the temperature range of said esterification reaction ranges from about the boiling point to about 90° C. above the boiling point of said glycol, wherein the pressure of said vessel ranges from about 25 psi to about 80 psi, and
wherein said condensation catalyst is selected from the class consisting of antimony, iron, titanium, zinc, cobalt, lead, manganese, and niobium.

21. A product according to claim 16 or 18, wherein said dicarboxylic acid is terephthalic acid, and wherein said glycol is selected from the class consisting of ethylene glycol and 1,4-butane diol.

22. A product according to claim 20, wherein said glycol-dicarboxylic acid equivalent weight ratio for said entire esterification reaction ranges from 0.9 to 1.4.

23. A product according to claim 22, wherein said glycol-acid equivalent weight ratio for said entire esterification reaction ranges from about 1.5 to about 1.25.

* * * * *